United States Patent [19]

Gilmore

[11] 4,050,335
[45] Sept. 27, 1977

[54] PORTABLE GROOVING TOOL

[75] Inventor: Guy T. Gilmore, Crosby, Tex.

[73] Assignee: Multi-Fab, Inc., Houston, Tex.

[21] Appl. No.: 665,859

[22] Filed: Mar. 10, 1976

[51] Int. Cl.² .............................................. B23B 5/16
[52] U.S. Cl. .................................................. 82/4 C
[58] Field of Search ........................... 82/4 C; 30/97

[56]  References Cited
U.S. PATENT DOCUMENTS

| 145,103 | 12/1873 | Henderson et al. | 82/4 C |
| 3,124,024 | 3/1964 | Pittman | 82/4 C |
| 3,630,109 | 12/1971 | MacMichael et al. | 82/4 C |
| 3,772,944 | 11/1973 | Becker et al. | 82/4 C |
| 3,916,519 | 11/1975 | Gilmore | 30/97 |

Primary Examiner—Leonidas Vlachos
Attorney, Agent, or Firm—Ranseler O. Wyatt

[57]  ABSTRACT

A flange grooving tool for grooving or re-grooving flanges in relatively small tubular members, having novel means for adjusting a cutting member to the desired circumferential path and having means for the direct gear drive of a rotating member at a controlled speed.

1 Claim, 4 Drawing Figures

PORTABLE GROOVING TOOL

BACKGROUND OF THE INVENTION

Portable flange cutting and grooving tools are available on the market for work on large vessels or tubular material. However, where small vessels or tubular material are encountered, the range of adjustment on machines presently available does not include the smaller work pieces. It is an object of this invention to provide a tool adaptable to the smaller work piece, and which is readily portable and more readily applicable to work in restricted areas.

SUMMARY OF THE INVENTION

A flange grooving tool having means for securing the tool to the work and having a direct gear drive for rotating a cutting member with means for adjusting the position of the cutting tool and maintaining same in the desired position during the grooving action, said rotating member having adjustable means to place a drag on the rotating member to control the speed of the rotation.

DESCRIPTION OF THE PREFERRED EMBODIMENT

Figure 1:
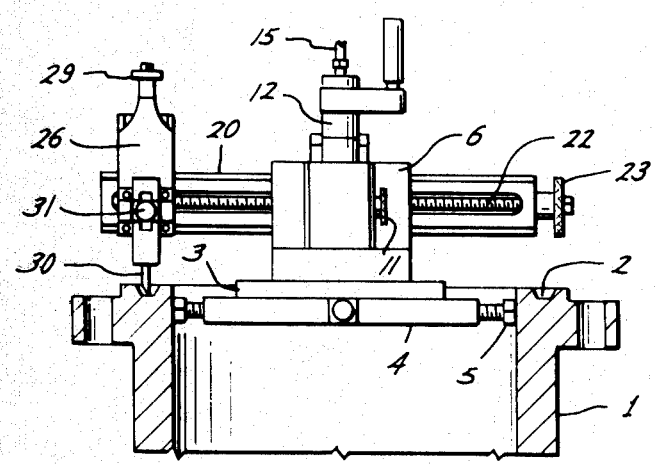
FIG. 1 is a side elevational view of the device, partially in cross section, mounted in a tubular work piece.
Figure 2:
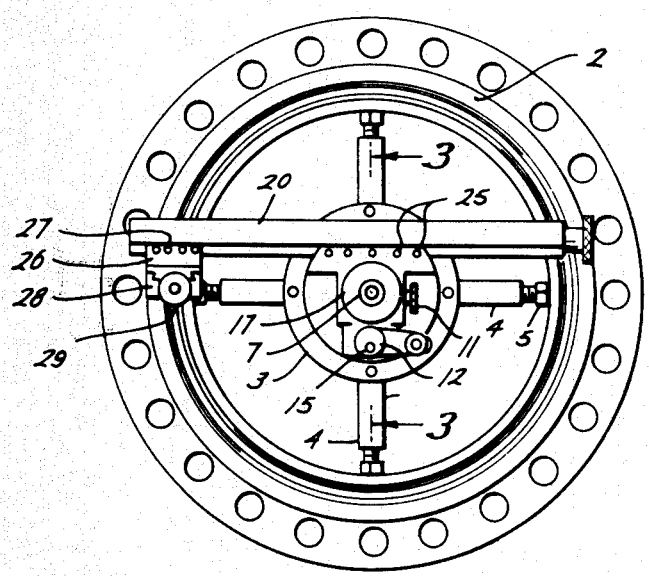
FIG. 2 is a top view, of the view shown in FIG 1.
Figure 3:
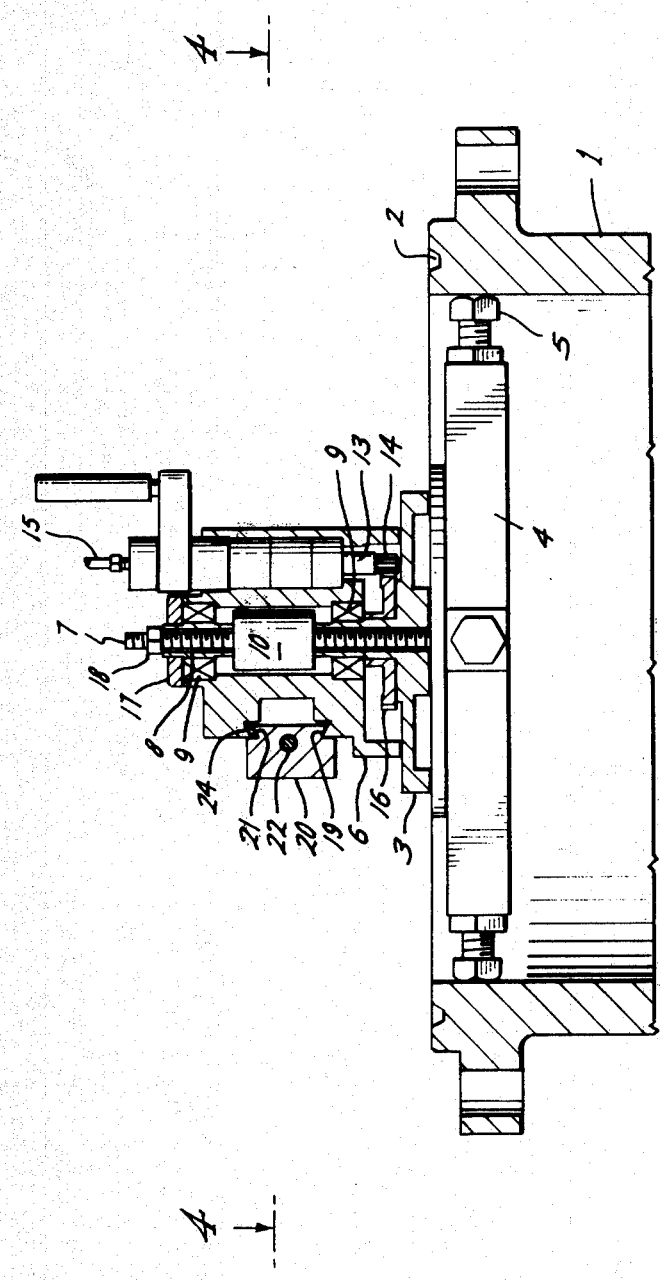
FIG. 3 is a side elevational cross sectional view.
Figure 4:
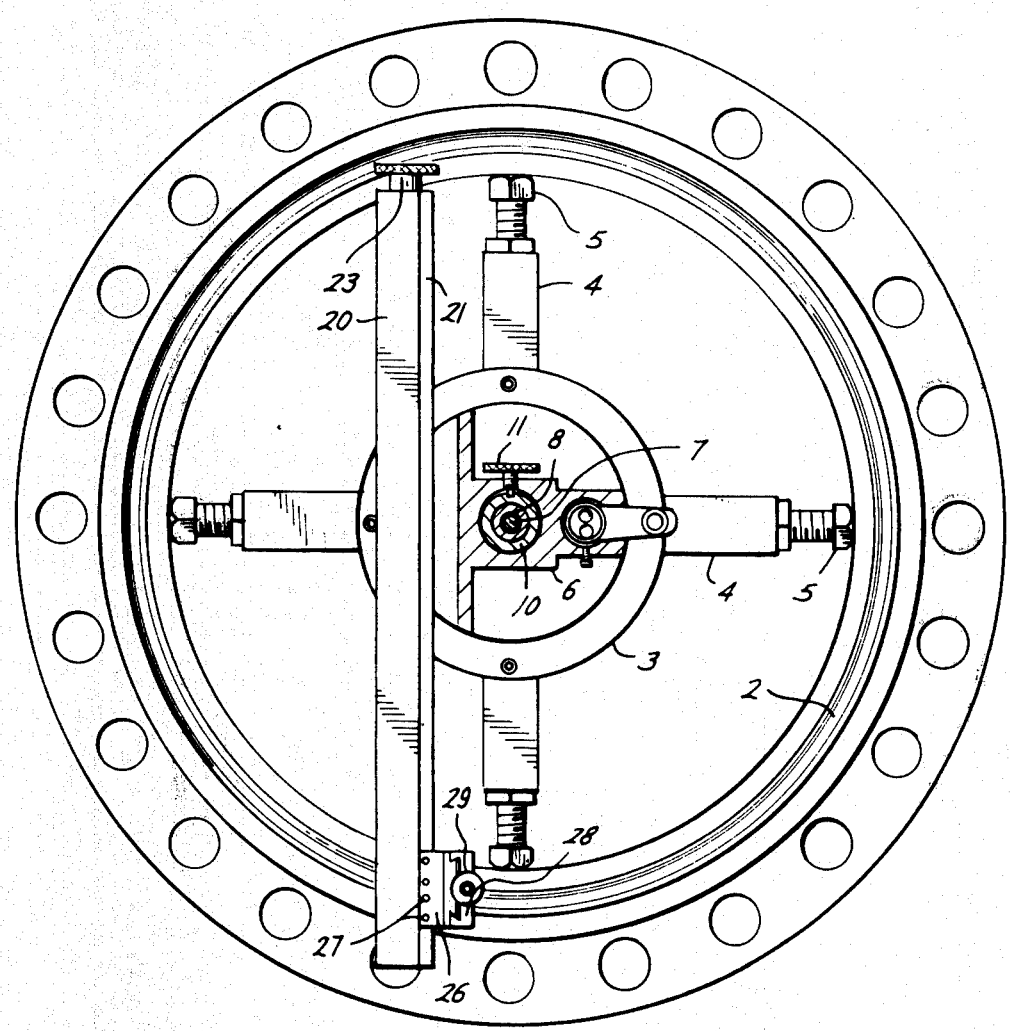
FIG. 4 is a fragmentary, enlarged top plan view illustrating the drag means employed, and taken on the line 4—4 of FIG. 3.

In the drawings, the numeral 1 designates a tubular member in which an annular groove 2 is cut, or to be cut. The base member 3 of the unit is equipped with a spider 4 for mounting inside a tubular member, the abutting ends 5, 5 of the spider being externally threaded to permit inward and outward movement so that the base member 3 may be centered in the tubular member 1. Rotatably mounted on the base member 3 is the housing 6 through which the externally threaded axial shaft 7 extends and seated in the longitudinal passageway 8 of the housing 6, are the bearings 9, 9 and the friction bushing 10. A thumb screw 11 extends through the housing 6 and bears against the bushing 10 to provide a drag on the rotation of the housing 6 to prevent backlash, particularly when a burr is being used in the cutting tool holder. The motor 12, preferably a pneumatic motor, drives the shaft 13 and gear 14, and an air connector 15 is mounted on the top of the motor assembly.

Mounted on the base member 3 is the ring gear 16, the peripheral teeth of the gear 16 being in mesh with the gear 14, the housing 6 rotating around the shaft 7 when the gear 14 is rotated. Nuts 17, 18 maintain the housing 6 on the shaft 7.

Longitudinally adjustable in the groove 19 is the arm 20, having the laterally projecting dovetail member 21, and axially mounted in the arm 20 is the externally threaded adjusting shaft 22, having a manually operated knob 23 at one end. A locking plate 24 is detachably mounted between one wall of the member 21 and one wall of the groove 19. Screws 25, 25 maintain the plate 24 in place.

A cutting tool holder mount 26 is mounted on the dovetail member 21 of the arm 20, and is adjustable longitudinally on said arm 20, and a plate (not shown) similar to the plate 24, is similarly mounted on the mount 26 by means of the screws 27, to lock the tool holder mount 26 in the selected position on the arm 20. A tool holder 28 is vertically adjustably mounted on the mount 26, and is actuated by means of the knob 29 to feed the tool into the work. A cutting tool 30 is vertically adjustable in the tool holder 26 by means of the bolt 31.

In operation, the spider is adjusted to center the device on the tubular member to be grooved, the ends of the spider being adjustable and bearing against the inside wall of the tubular member 1. The arm 20 is adjusted to the desired position by loosening the screws 25 and sliding the arm laterally. When the desired position is reached, the screws are tightened to lock the arm in place. Similarly the cutting tool holder mount 26 is moved laterally to the desired position on the arm 20 by loosening the screws 27 and sliding the mount on the lateral member 21 of the arm 20 by rotating the knob 23. When the desired position is reached, the screws 27 are tightened and the mount locked in position. The cutting tool is set by loosening the nut 31 and adjusting the cutting tool 30 to the desired position. As the work proceeds, the cutting tool 30 is fed into the work b rotation of the knob 29, vertically adjusting the tool holder 26.

What I claim is:

1. A portable grooving tool having means for mounting same in a tubular work piece, a base member fixedly centered in said work piece, a shaft mounted vertically in said base member, a ring gear fixedly mounted on said base member and coaxially with said base member, a rotatable member mounted on said shaft and means for rotating said rotatable member around said shaft including a gear in mesh with said ring gear, means for controlling the speed of rotation of said rotating member, a transversely adjustable arm mounted on said rotating member and a vertically movable cutting tool mounted on said arm, said rotating member having coaxial, antifriction bearings therein, a bushing coaxially mounted in said housing and between said bearings, and means for placing a drag on said bushing to control the speed of rotation of the rotating member.

* * * * *